US011167862B2

(12) United States Patent
Mostafa

(10) Patent No.: US 11,167,862 B2
(45) Date of Patent: Nov. 9, 2021

(54) METHOD AND SYSTEM FOR SURVEILLANCE, RECORDING AND TRANSMITTING ALL THE EVENTS ON BOARD OF THE AIRCRAFTS TO THE GROUND STATIONS BY DATA LINK OVER HF

(71) Applicant: Ahmed Hassan Fouad Ahmed Mostafa, Cairo (EG)

(72) Inventor: Ahmed Hassan Fouad Ahmed Mostafa, Cairo (EG)

( * ) Notice: Subject to any disclaimer, the term of this patent is extended or adjusted under 35 U.S.C. 154(b) by 0 days.

(21) Appl. No.: 16/319,665

(22) PCT Filed: Jan. 1, 2017

(86) PCT No.: PCT/EG2017/000001
§ 371 (c)(1),
(2) Date: Jan. 22, 2019

(87) PCT Pub. No.: WO2018/024310
PCT Pub. Date: Feb. 8, 2018

(65) Prior Publication Data
US 2020/0298996 A1 Sep. 24, 2020

(30) Foreign Application Priority Data
Jul. 31, 2016 (EG) .................. 2016071260

(51) Int. Cl.
*B64D 45/08* (2006.01)
*B64D 45/00* (2006.01)
*B64D 47/08* (2006.01)
*G07C 5/00* (2006.01)
*G07C 5/08* (2006.01)

(52) U.S. Cl.
CPC ........ *B64D 45/0053* (2019.08); *B64D 47/08* (2013.01); *G07C 5/008* (2013.01); *G07C 5/0866* (2013.01); *B64D 2045/0065* (2013.01)

(58) Field of Classification Search
None
See application file for complete search history.

(56) References Cited

U.S. PATENT DOCUMENTS

| 6,915,190 B2 | 7/2005 | Galasso |
| 8,023,936 B2 | 9/2011 | Hudson et al. |
| 8,488,658 B1 * | 7/2013 | Blocksome ....... H04L 25/03343 375/222 |
| 2003/0152145 A1 * | 8/2003 | Kawakita ............... H04N 7/083 375/240.12 |

(Continued)

FOREIGN PATENT DOCUMENTS

CN 103024925 A 4/2013

OTHER PUBLICATIONS

International Search Report for application No. PCT/EG2017/000001.

*Primary Examiner* — Eileen M Adams
(74) *Attorney, Agent, or Firm* — Sughrue Mion, PLLC

(57) ABSTRACT

It is an integrated system that (RECORD) registers the events on the plane (video/audio) and stored on the hard disk to get to know the truth of what happened on the aircraft in emergency situations and disasters and we can also get a live broadcasting of the events WHILE THE FLIGHT in an emergency by using (wifi) satellite internet or data over hf (wbhf) technology with ad hoc.

3 Claims, 2 Drawing Sheets

(56) References Cited

U.S. PATENT DOCUMENTS

| | | | |
|---|---|---|---|
| 2008/0057942 A1* | 3/2008 | Woods .................... | H04L 67/18 455/425 |
| 2014/0176668 A1* | 6/2014 | Boucourt ........... | H04N 5/23238 348/36 |
| 2015/0112542 A1* | 4/2015 | Fuglewicz ........... | G07C 5/0816 701/32.2 |

* cited by examiner

Fig ( 1 )
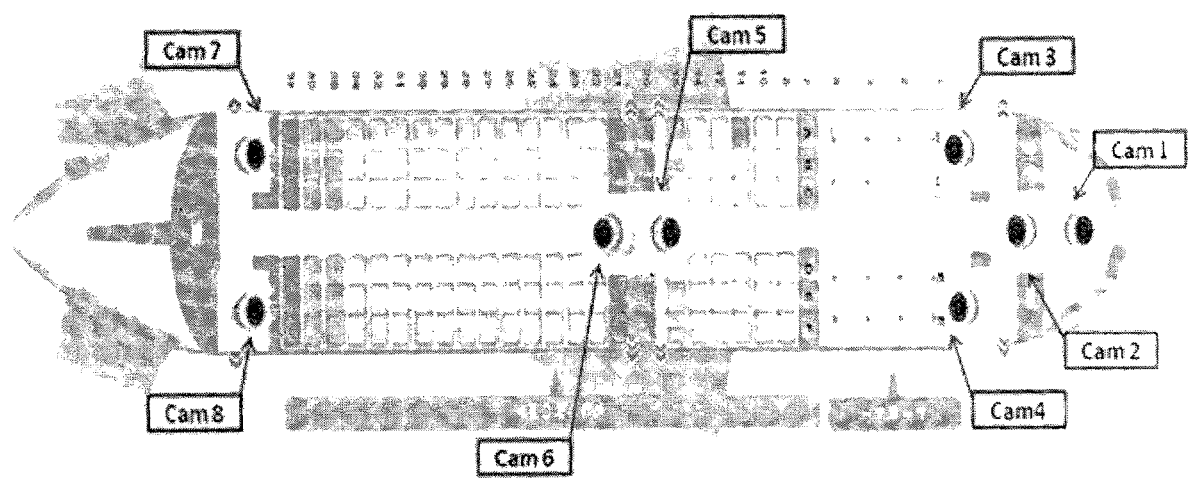

Fig ( 2 )
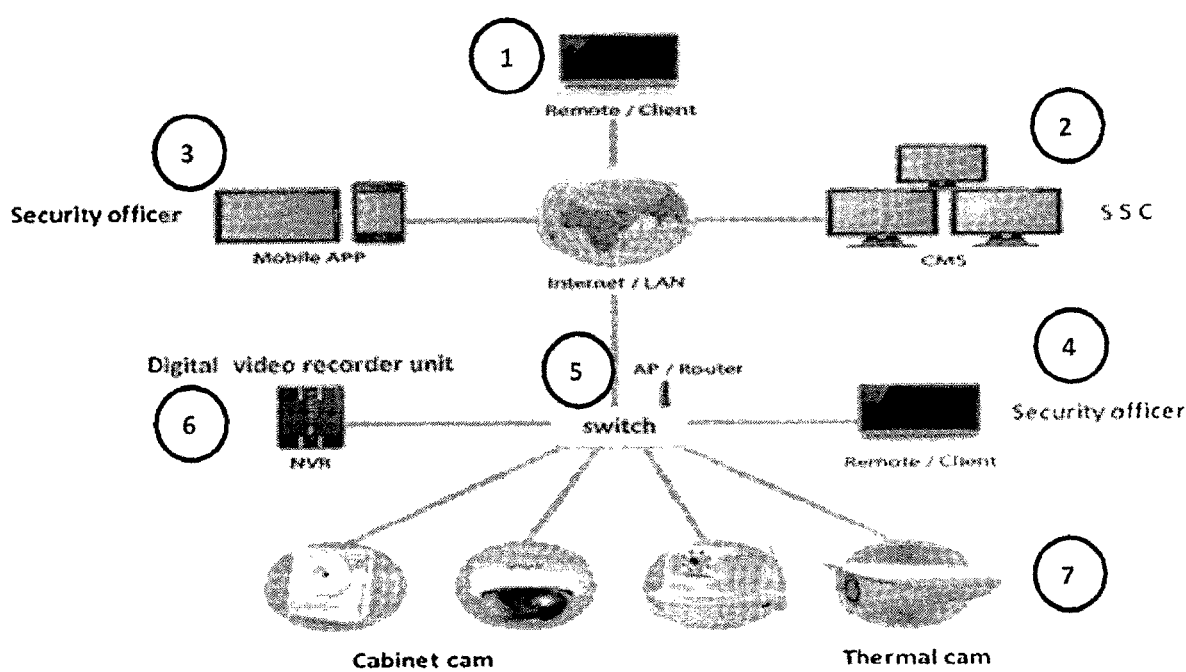

METHOD AND SYSTEM FOR SURVEILLANCE, RECORDING AND TRANSMITTING ALL THE EVENTS ON BOARD OF THE AIRCRAFTS TO THE GROUND STATIONS BY DATA LINK OVER HF

TECHNICAL FIELD

Avionics

Background Art

Black Box

There are two funds in each plane, not a single box located in the back of the plane to record the what happens to the plane.

The First Black Box (FDR) Flight Data Recorder:

Records technical data and physical values including (temperature-speed-direction-altitude-trajectory). 25 H recording time The Second Black Box (CVR) Cockpit Voice Recorder:

Its function record conversations between crew members-air traffic control with towers. 25 H recording time

Problem or Deficiencies in the Prior Art

Recording the events on the plane without (Video) which makes some of the events on the opaque plane which makes it difficult to know what really happened.

EXAMPLE

1—Egypt Air plane was hijacked on Tuesday 29 Mar. 2016 and change the destination of Cyprus.

2—Libyan plane was hijacked on Friday 23 Dec. 2016 and change the destination of MALTA.

Disclosure of Invention

The Job:

White Fund (Reagent Facts):

The embodiment is to record all the events on the plane (voice/image) by using integrated surveillance system with cctv and broadcast events when necessary or Emergency situations in cases of (abduction/assaults).

Contents:

The digital recording unit (DVR/NVR).

digital broadcasting Unit (Router).

At least 8 to 16 Cameras (Digital/IP/thermal).

Hard disk with large capacity.

Properties:

These devices will be saved like the black box in order to keep the information in very solid molds made of strong materials such as titanium element, surrounded by insulating material protects it from being damaged.

Recording time: 170 hours.

Number of Channels: From 4:16 channel.

Working Method:

1—The surveillance cameras record all what was going on the plane by video and audio and register the events on the hard disk existing in digital recording unit.

2—In emergencies we can access into the system by access control (user name-password) to get the image to make an estimate of the position of emergency to take the Appropriate action according to the data available from the image (stored/transmitted).

With Restricted system (access controlled) is done by the user name+password to protect The available information and to prevent anyone from access to the system.

3—We can get the picture in two ways:

The first way (Live):

The aircraft is equipped with wi fi internet or wireless communication devices operating in hf Band with using data over hf (wbhf) wide band hf with ad hoc Technology.

The second way (playback):

After aircraft landing or from the hard desk by getting the white box from the disaster.

FIG. 1 discloses an interior of an airplane according to an embodiment. For example, a camera 1 is positioned to record the events inside the cockpit. Camera 2 (a thermal camera) is positioned to check passengers when entering the plane. Cameras 3, 4, 5, 6, 7 and 8 further record events inside the plane.

The number of cameras inside the plane can be increased up to 16 cameras. This depends on the size of the aircraft and/or the requirements of security and safety. This may include the luggage surveillance zone during loading and unloading.

FIG. 2 discloses a diagram according to an embodiment. For example, a remote/client 1 may be configured to monitor for the airport's operations center. The remote/client may be configured to communicate with a mobile app 3 or CMS 2 via internet/LAN. Further, an AP/Router may be in communicable contact with the remote/client 1, mobile app 3, CMS 2, through the internet/LAN. The AP/router may be configured to receive information regarding events from the cabin cameras and thermal cameras, as disclosed in FIG. 1. The information received from the cabin cameras and thermal camera may be recorded and saved via a digital video recorder unit that may be in communication with the AP/Router.

Further, in regard to FIG. 2, the remote/client 1 may be used by a user to monitor the airplane for the airport's operations center. The CMS may be used by a user to monitor the airplane for the agencies concerned. The remote/client 4 may be used by a security officer in the front of the airplane to monitor the situation locally. The NVR digital video recorder unit 6 may be used by a security officer in the back of the airplane to monitor the situation locally.

It is to be understood that the disclosure is not limited to the above embodiment, but the embodiment may be modified as needed, without departing from the principle of the disclosure.

The invention claimed is:

1. A system for monitoring an aircraft by transmitting all its data to a ground receiving station directly using data link (Data Over HF) via a high frequency band with a wideband High Frequency (WBHF) technology with AD-HOC feature, the system comprising:

a plurality of cameras comprising an A/V camera to capture a cockpit status, a thermal camera to capture all entrances into the aircraft, A/V cameras to capture and monitor all events in passengers' cabin, and thermal cameras to capture all entrance into luggage store;

a digital video recording unit to record audio/video of events onboard and store the recorded audio/video on a hard disk after audio/video compression;

a digital broadcasting unit to transfer the audio/video to aircraft security officers and, at a same time, to the ground station;

the ground station to receive the audio/video in real-time by using wireless communications devices fitted in the aircraft;

a data collection center to receive and store the audio/video to enable investigation authorities to analyze the recorded audio/video in case of emergency situations, disasters, and mysterious incidents via surveillance and/or control center in airport.

2. The system according to claim 1, wherein the system provides transmission of the audio/video of conversations inside a cockpit to the ground station and stores audio/video in order to observe a pilot's status and procedures throughout a flight.

3. The system according to claim 1, wherein the plurality of cameras are configured in the aircraft to check a security status during performing of logistic operations while preparing the aircraft for a flight, and the system is configured to monitor the aircraft during preparation before flights.

\* \* \* \* \*